United States Patent
Ou et al.

(10) Patent No.: US 10,782,739 B2
(45) Date of Patent: Sep. 22, 2020

(54) ELECTRONIC DEVICE WITH FLEXIBLE DISPLAY

(71) Applicant: Google LLC, Mountain View, CA (US)

(72) Inventors: Davis Ou, New Taipei (TW); Hsu An-Szu, Wollerau (CH); Han-Wen Yeh, New Taipei (TW); Mike Liu, Mountain View, CA (US); Penyu Liao, Taoyuan (TW); Yao Hsu-Hong, New Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/173,486

(22) Filed: Oct. 29, 2018

(65) Prior Publication Data

US 2020/0133341 A1 Apr. 30, 2020

(51) Int. Cl.
*G06F 1/16* (2006.01)
*H04M 1/02* (2006.01)

(52) U.S. Cl.
CPC .......... *G06F 1/1652* (2013.01); *G06F 1/1616* (2013.01); *G06F 1/1624* (2013.01); *G06F 1/1641* (2013.01); *H04M 1/0214* (2013.01); *H04M 1/0268* (2013.01)

(58) Field of Classification Search
CPC ...... G09F 9/301; G06F 1/1652; G06F 1/1616; G09G 3/32; G09G 2310/04; G09G 2320/043; G09G 2320/0252; G09G 2320/0242; G09G 2340/0407; G09G 3/2003
See application file for complete search history.

(56) References Cited

U.S. PATENT DOCUMENTS

| | | | |
|---|---|---|---|
| 9,195,272 B2 | 11/2015 | OBrien | |
| 9,971,382 B2 | 5/2018 | Ahrens et al. | |
| 2009/0244012 A1* | 10/2009 | Behar | G06F 1/162 |
| | | | 345/169 |
| 2012/0162876 A1* | 6/2012 | Kim | H04M 1/0237 |
| | | | 361/679.01 |
| 2015/0257290 A1* | 9/2015 | Lee | H05K 5/0021 |
| | | | 361/749 |
| 2015/0366089 A1 | 12/2015 | Park et al. | |
| 2017/0169741 A1 | 6/2017 | Lim | |
| 2018/0309861 A1* | 10/2018 | Lin | H04M 1/021 |
| 2019/0179373 A1* | 6/2019 | Cheng | F16C 11/12 |

FOREIGN PATENT DOCUMENTS

CN 206206383 U 5/2017
WO WO 2017211115 A1 * 12/2017

OTHER PUBLICATIONS

International Search Report and Written Opinion for Application No. PCT/US2019/057215, dated Jan. 20, 2020, 21 pages.

* cited by examiner

*Primary Examiner* — Md Saiful A Siddiqui
(74) *Attorney, Agent, or Firm* — Brake Hughes Bellermann LLP

(57) ABSTRACT

An electronic device includes: a processor; a memory; a first body member; a second body member; a flexible display, wherein a first portion of the flexible display is mounted to the first body member, and wherein a second portion of the flexible display is mounted to the second body member; a shaft mounted to the second body member; a hinge coupled to the first and second body members; a first arm having a first pivot with the first body member; and a threaded coupling between the first arm and the shaft.

23 Claims, 6 Drawing Sheets

ELECTRONIC DEVICE WITH FLEXIBLE DISPLAY

TECHNICAL FIELD

This document relates, generally, to an electronic device with a flexible display.

BACKGROUND

Electronic devices such as smartphones and tablets are sometimes designed so that an enclosure is formed by a housing and a display of the electronic device joined to each other. Introduction of new types of displays including flexible displays can place additional demands on the enclosure in this or other regards.

SUMMARY

In a first aspect, an electronic device includes: a processor; a memory; a first body member; a second body member; a flexible display, wherein a first portion of the flexible display is mounted to the first body member, and wherein a second portion of the flexible display is mounted to the second body member; a shaft mounted to the second body member; a hinge coupled to the first and second body members; a first arm having a first pivot with the first body member; and a threaded coupling between the first arm and the shaft.

Implementations can include any or all of the following features. The threaded coupling comprises a groove and a pin. The groove is positioned on the shaft. The first arm is engaged with the shaft using a bracket, the first arm having a second pivot with the bracket. Advancement of the bracket along the shaft rotates the first arm about the first and second pivots. The electronic device further comprises a plate attached to the hinge and slidingly coupled to the first body member, the hinge coupled to the first body member by the plate, wherein the first arm has a second pivot with the plate. The electronic device further comprising a second arm having a third pivot with the plate and a fourth pivot with the first body member, the second arm engaged with the shaft. The first arm comprises a first portion and a second portion angled to each other, and wherein the first pivot is positioned at an end of the first portion of the first arm. The second pivot is positioned at a junction between the first and second portions of the first arm.

In a second aspect, an electronic device includes: a processor; a memory; a first body member; a second body member; a flexible display, wherein a first portion of the flexible display is mounted to the first body member, and wherein a second portion of the flexible display is mounted to the second body member; a plate coupled to the second body member by a hinge; an arm having a first pivot with the first body member and a second pivot with the plate; and a threaded coupling between the arm and the second body member.

Implementations can include any or all of the following features. The threaded coupling comprises a shaft coupled to the second body member, and a bracket coupled to the arm. The threaded coupling comprises a spiral groove on one of the bracket or the shaft, and a pin on another of the bracket or the shaft, the pin configured to engage with the spiral groove.

In a third aspect, an electronic device includes: a processor; a memory; a first body member; a second body member; a flexible display, wherein a first portion of the flexible display is mounted to the first body member, and wherein a second portion of the flexible display is mounted to the second body member; a plate coupled to the second body member by a hinge having a rotation axis, the plate slidingly coupled to the first body member; and an arm pivotally coupled to the first body member, the arm engaging with the second body member to advance the first body member perpendicular to the rotation axis upon relative rotation between the first and second body members.

Implementations can include any or all of the following features. The arm has a first pivot with the first body member. The arm comprises a first portion and a second portion angled to each other, wherein the first pivot is positioned at an end of the first portion of the arm, and wherein an end of the second portion of the arm engages with the second body member. The arm has a second pivot with the plate at a junction of the first and second portions of the arm, the second pivot facilitating rotation of the arm in a plane parallel to the plate between a first position corresponding to an open state of the electronic device, and a second position corresponding to a closed state of the electronic device. The electronic device further comprises a recess in the plate configured to accommodate the arm in the first and second positions. The electronic device further comprises a shaft coupled to the second body member, wherein the arm engages with the shaft. The electronic device further comprises a bracket coupled to the arm, wherein the arm engages with the shaft through the bracket. The bracket is pivotally coupled to the arm. The bracket comprises a cylinder surrounding the shaft. The electronic device further comprises a spiral groove on one of the cylinder or the shaft, and a pin on another of the cylinder or the shaft, the pin configured to engage with the spiral groove.

BRIEF DESCRIPTION OF DRAWINGS

Like reference symbols in the various drawings indicate like elements.

DETAILED DESCRIPTION

This document describes examples of electronic devices having flexible displays. In some implementations, an electronic device with a flexible display such as an organic light-emitting diode (OLED) display can be embodied using two main parts that allow the device to be folded in the middle. In an open state, the flexible display can be substantially planar, and in a closed state the flexible display can be folded by substantially 180 degrees. A mechanism can be provided that protects the flexible display in and between the open and closed states.

Figure 1:
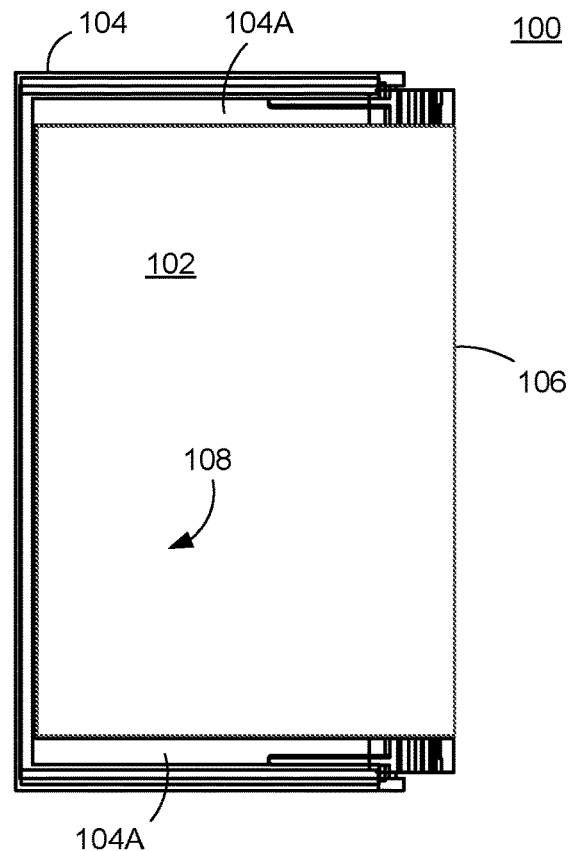
FIG. 1 shows an example of an electronic device in a closed state.

FIG. 1 shows an example of an electronic device 100 in a closed state. The electronic device 100 can be used with one or more examples described elsewhere herein. The electronic device 100 can be implemented according to one or more examples described with reference to FIG. 8. In some implementations, the electronic device 100 can be considered a smartphone and/or a tablet device.

The electronic device 100 includes a flexible display 102. A body member 104 is also visible in the present view. The electronic device 100 is shown in a closed state. In some implementations, the flexible display 102 has a curved portion 106 when the electronic device 100 is in the closed state. For example, the flexible display can be folded by substantially 180 degrees by way of the curved portion 106. A portion 108 of the flexible display 102 is mounted to the body member 104. For example, a frame 104A of the body member 104 can be placed adjacent the flexible display 102. A remainder of the flexible display 102 may not be mounted to the body member 104, for example as will be described below.

The flexible display 102 can include one or more substrates that are electronically controllable to present content on the flexible display 102. The flexible display 102 can include an array of individually energizable elements that can selectively be activated to form visual output (e.g., text, symbols, and/or images). For example, the flexible display 102 can include an OLED display. As another example, the flexible display 102 can operate based on one or more of the technologies that are sometimes referred to as electronic paper, such technology being implemented in a substrate of sufficient flexibility to facilitate bending of the flexible display 102.

Figure 2:
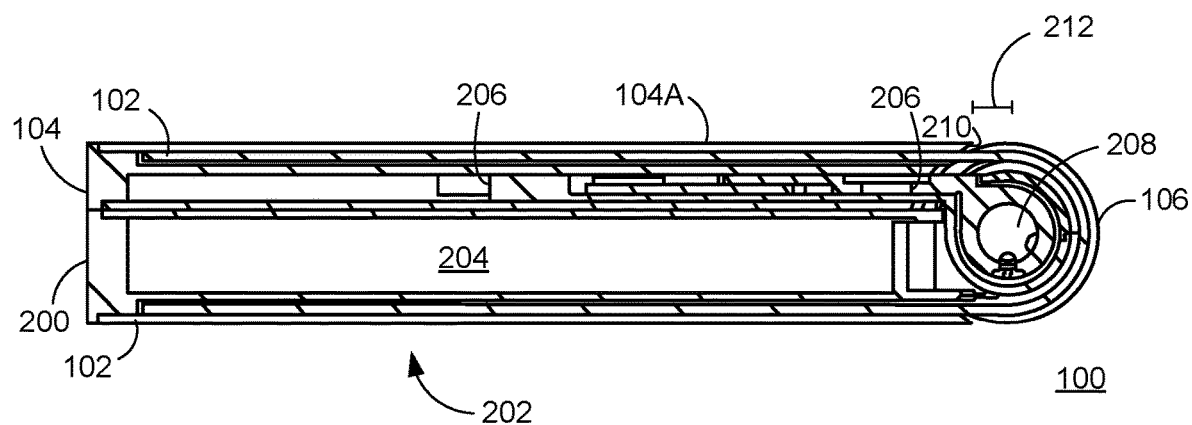
FIG. 2 shows an example cross-section of the electronic device of FIG. 1 in the closed state.

FIG. 2 shows an example cross-section of the electronic device 100 of FIG. 1 in the closed state. The electronic device 100 includes a body member 200 that was obscured in FIG. 1. The flexible display 102 includes a portion 202 that is mounted to the body member 200. The curved portion 106 of the flexible display 102 is here bridging between the body members 104 and 200.

The body members 104 and 200 can be made of the same or different material(s). For example, the body member 104 and/or 200 can include metal (e.g., an aluminum alloy) and/or a polymer material (e.g., a thermoplastic material). The body members 104 and 200 can be manufactured by any suitable process, including, but not limited to, by machining, casting, and/or molding.

Electronics 204 of the electronic device 100 are here schematically illustrated as being included in the body member 200. The electronics 204 can include some or all aspects described in the examples relating to FIG. 8. In some implementations, substantially all electronic components of the electronic device 100, except the flexible display 102, can be included in the electronics 204.

The electronic device 100 includes a plate 206 that is coupled to the body member 200 by a hinge 208. That is, the hinge can be mounted on the plate 206 and on the body member 200. The plate 206 can be slidingly coupled to the body member 104. For example, the body member 104 and the plate 206 can be bound together by one or more structures that allow relative sliding motion between the body member 104 and the plate 206. This can allow the body member 104 to slide relative to other structures of the electronic device 100, including, but not limited to, the body member 200 and/or the hinge 208.

The frame 104A of the body member 104 has an end 210 that is also adjacent the flexible display 102. A distance 212 between the end 210 and a center of the hinge 208 is here illustrated. The distance 212 is a measure of how far from or close to the hinge 208 the body member 104 has slid in a particular state of the electronic device 100, and here corresponds to the closed state of the electronic device 100. For example, in the closed state of the electronic device 100 the distance 212 can be shorter than in some or all other states (e.g., an open state).

The electronic device 100 can operate in the closed configuration. For example, content can be presented on the portion 108 of the flexible display 102 and can be visible to a user who faces the body member 104. As another example, content can be presented on the portion 202 of the flexible display 102 and can be visible to a user who faces the body member 200. As another example, content can be presented on the curved portion 106 of the flexible display 102 and can be visible to a user who faces the hinge 208.

Figure 3:
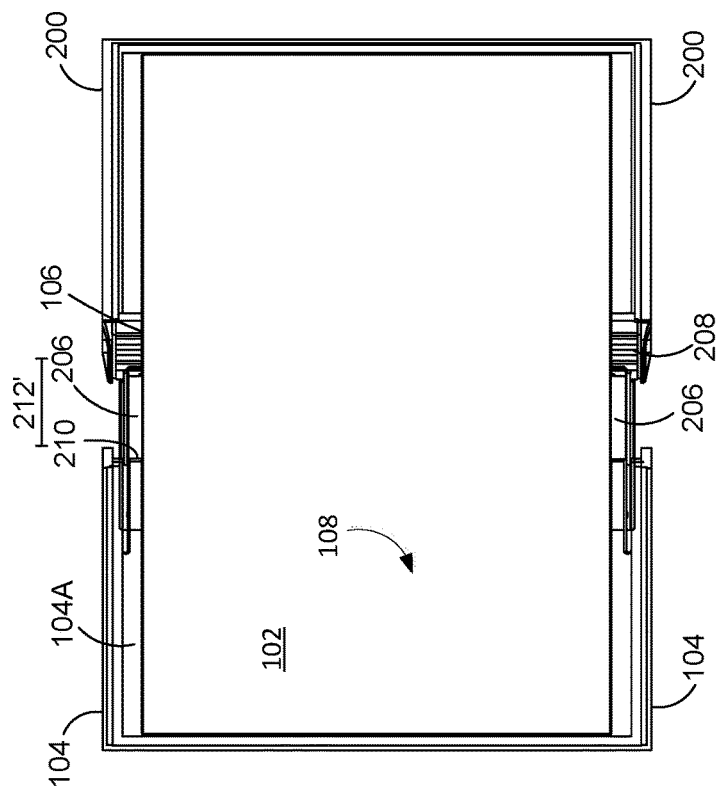
FIG. 3 shows an example of the electronic device of FIG. 1 in an open state.
Figure 4:
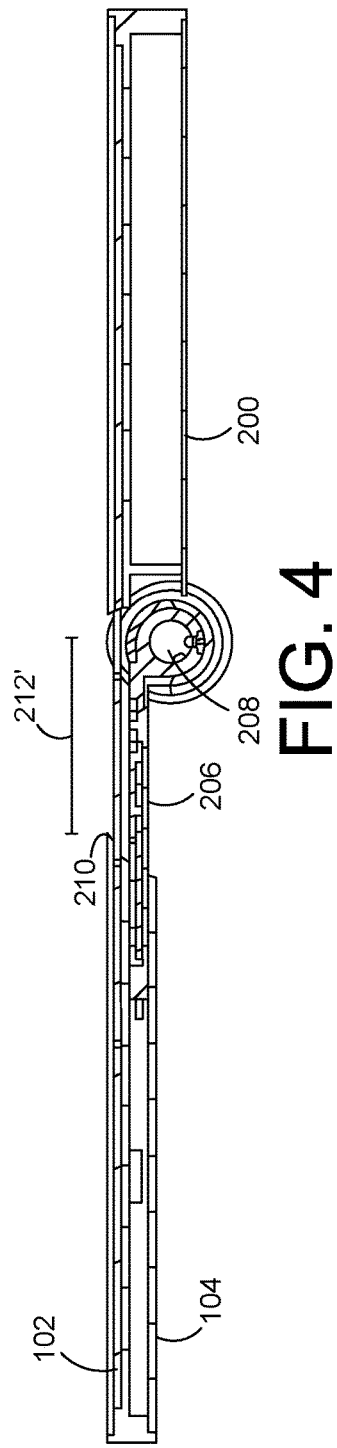
FIG. 4 shows an example cross-section of the electronic device of FIG. 1 in the open state.

FIG. 3 shows an example of the electronic device 100 of FIG. 1 in an open state. FIG. 4 shows an example cross-section of the electronic device of FIG. 1 in the open state. The electronic device 100 can be brought to the closed state, the open state, and/or to any state in between the closed or open states, by mechanically folding the electronic device 100 about the hinge 208. For example, a user folds or unfolds the electronic device 100 using his or her hands. As another example, the electronic device 100 contains an actuator that drives the electronic device 100 (e.g., by way of acting on the hinge 208) into one or more states.

In the open state, the flexible display 102 can have a substantially planar orientation. Using FIG. 1 as a reference only for purpose of explanation, the body member 104 remains essentially in the orientation of FIG. 1. The body member 200, moreover, has been rotated about the hinge 208 until the flexible display 102 assumes the planar orientation. The plate 206 has facilitated a relative sliding with the body member 104. This can be characterized as the body member 104 having slid relative to the plate 206 in a direction (in this example) away from the hinge 208. For example, this can correspond to the end 210 of the frame 104A now being separated from the center of the hinge 208 by a distance 212' greater than the distance 212 (FIG. 2).

The body members 104 and 200 can support the flexible display 102 in any state of the electronic device 100. In the open state (e.g., FIGS. 3-4), the body members 104 and 200 can provide a planar supportive structure that facilitates the planar orientation of the flexible display 102. In the closed state (e.g., FIGS. 1-2), the body members 104 and 200 can provide a supportive structure that facilitates the 180 degree fold of the flexible display 102.

Figure 5A:
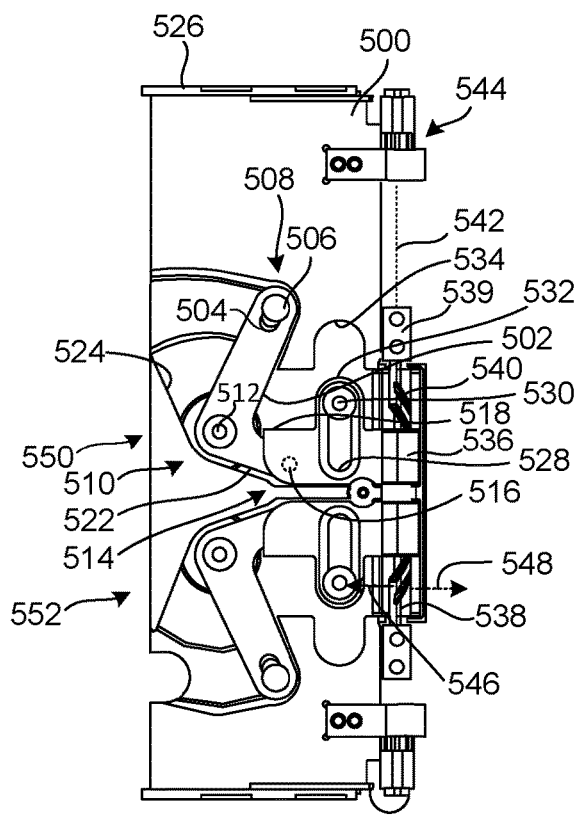
FIG. 5A shows an example of a plate corresponding to a closed state.

FIG. 5A shows an example of a plate 500 corresponding to a closed state. The plate 500 can be made from any suitable material, including, but not limited to, metal. The plate 500 can be used with one or more examples described elsewhere herein. In some implementations, the plate 500 can serve as the plate 206 (FIGS. 2-4). For example, the plate 500 can be coupled to the body member 200 (FIGS. 2-4), such as by the hinge 208. As another example, the plate 500 can be slidingly coupled to the body member 104 (FIGS. 1-4).

The plate 500 can have an arm 502. The arm 502 can be made from any suitable material, including, but not limited to, metal. The arm 502 can have an opening 504 configured to accommodate a pin 506. In some implementations, the pin 506 can be configured to be mounted to the body member 104 (FIGS. 1-4). For example, the pin 506 and the opening 504 can form a pivot 508 such that the arm 502 is pivotally coupled to the body member 104 (FIGS. 1-4). The opening 504 can be larger than a profile of the pin 506 to allow relative movement between the pin 506 and the arm 502.

The arm 502 can have a pivot 510 formed by a pin 512 that is mounted to the plate 500. The arm 502 can be pivotally coupled to the plate 500 by way of the pivot 510. The pivot 510 can facilitate rotation of the arm 502 in a plane that is parallel to the plate 500 (e.g., the plane can lie in the plane of the drawing in this example).

The arm 502 can have a pivot 514 formed by a pin 516 (shown in phantom) that is mounted to the arm 502. The pin 516 can be mounted to a surface of the arm 502 that is currently obscured by a bracket 518, which may have an opening configured to accommodate the pin 516. The arm 502 can be pivotally coupled to the bracket 518 by way of the pivot 514. The bracket 518 can be made from any suitable material, including, but not limited to, metal.

The arm 502 is here substantially planar and has a shape resembling an L-shape. One limb of the L-shape can be formed by a portion 520 of the arm 502, and another limb of the L-shape can be formed by a portion 522 of the arm 502. The portions 520 and 522 can be angled to each other, including, but not limited to, by an angle in the range of about 80-120 degrees. In some implementations, the pivot 508 is positioned on the portion 520. For example, the pivot 508 can be positioned at an end of the portion 520. In some implementations, the pivot 510 is positioned on the portion 520 and/or on the portion 522. For example, the pivot 510 can be positioned at a junction of the portions 520 and 522. In some implementations, the pivot 514 is positioned on the portion 522. For example, the pivot 514 can be positioned at an end of the portion 522.

The pivot 510 facilitates rotation of the arm 502 into one or more positions. The position shown in FIG. 5A can correspond to a closed state of an electronic device (e.g., the electronic device 100 as shown in FIGS. 1-2).

The plate 500 can include a recess 524 that is configured to accommodate the arm 502 being rotated into one or more positions. The recess 524 can be formed by machining or stamping, to name just two examples. The recess 524 can accommodate placement of the arm 502 in any of multiple positions. In some implementations, the recess 524 accommodates the arm being placed in the position shown in FIG. 5A. For example, the arm 502 can substantially reach an edge of the recess 524 in the shown position.

The plate 500 can include a slider 526 that can facilitate the plate 500 being slidingly coupled to the body member 104 (FIGS. 1-4). For example, the slider 526 can be slidingly mounted on the plate 500 and can be coupled to the body member 104 to provide for relative sliding movement between the plate 500 and the body member 104. The slider 526 can be made from any suitable material, including, but not limited to, metal.

The bracket 518 can have an opening 528. In some implementations, the opening 528 can facilitate movement of the bracket 518 relative to the plate 500. A pin 530 can be mounted to the plate 500 and can be accommodated by the opening 528. The current position of the bracket 518 can correspond to a closed state of an electronic device (e.g., the electronic device 100 as shown in FIGS. 1-2). The movement of the bracket 518 relative to the plate 500 can facilitate insertion of a tongue 532 of the bracket 518 into a recess 534 of the plate. The recess 534 can be formed in a way similar to the recess 524.

The bracket 518 can have a cylinder 536 that can be positioned at an end opposite that where the bracket engages with the pin 516 of the arm 502. The cylinder 536 can facilitate threaded engagement with a shaft 538. The shaft 538 can be made from any suitable material, including, but not limited to, metal. The shaft 538 can be coupled to one of the body members of an electronic device. In some implementations, the shaft 538 can be mounted to the body member 200 (FIGS. 3-4) by at least one mounting bracket 539. For example, the mount can be a fixed mount so that the shaft 538 and the body member 200 both undergo the same rotation, or both remain stationary, relative to some other component.

The plate 500 can be configured so that rotation of the shaft 538 is transferred into linear displacement of the bracket 518. In some implementations, a threaded engagement can be provided. The shaft can have at least one groove 540 configured to engage with a pin (not shown) within the cylinder 536 of the bracket 518. For example, the groove 540 can be a spiral groove. As such, the structure (e.g., a pin) on the bracket 518 can be driven by a corresponding opening (e.g., the groove 540) on the shaft 538. As another example, an opening (not shown) on the bracket 518 can be driven by a corresponding structure on the shaft 538.

The current orientation of the shaft 538 can correspond to the closed state of an electronic device (e.g., the electronic device 100 as shown in FIGS. 1-2). In some implementations, relative rotation between the shaft 538 and the plate 500 can occur about a rotation axis 542. For example, such relative rotation can be accomplished by rotating the body member 200 (FIGS. 2-4) relative to the plate 500. The body member 200 can be rotated essentially counterclockwise about the hinge 208 (FIGS. 2-4), relative to the body member 104 (FIGS. 1-4), in bringing the electronic device toward the open state. For example, a counterclockwise rotation of the body member 200 can correspond to a counterclockwise rotation of the shaft 538 relative to the cylinder 536.

In the present illustration, a counterclockwise rotation of the shaft 538 corresponds to the following. The groove 540 can be provided on a surface of the shaft 538 that is essentially cylindrical. Only the side of the cylindrical surface of the shaft 538 that is closer to the viewer in the present illustration is currently visible, and the side of the cylindrical surface of the shaft 538 that is farther from the viewer in the present illustration is currently obscured. A portion of the visible cylindrical surface that is closest to the observer will travel along a direction marked by an arrow 546. For example, the direction of the arrow 546 is toward the left in the present illustration. A portion of the obscured cylindrical surface that is farthest from the observer will travel along a direction marked by an arrow 548 which is dashed because the portion is obscured. For example, the direction of the arrow 548 is toward the left in the present illustration.

The arm 502 can engage with the shaft 538 using the bracket 518. For example, this can be a threaded engagement. In some implementations, advancement of the bracket 518 along the shaft 538 rotates the arm 502 about the pivots 508, 510, and 514.

Figure 5B:
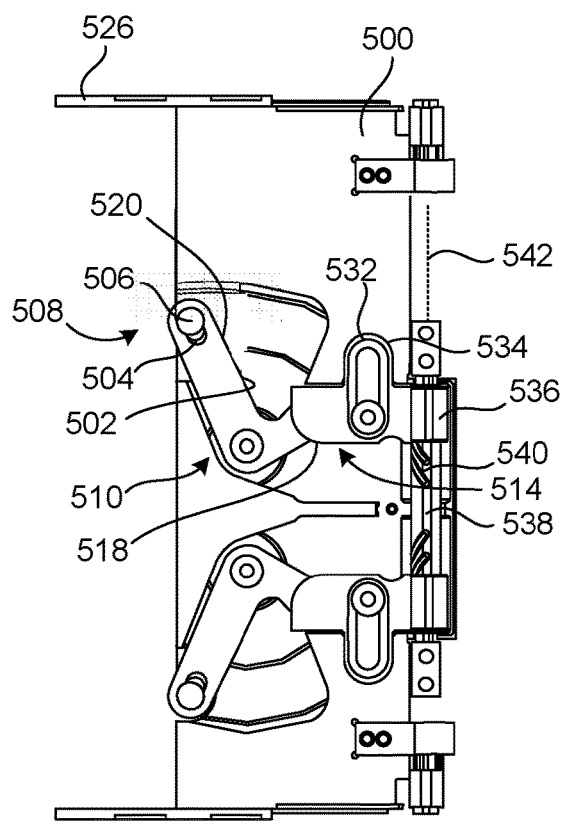
FIG. 5B shows an example of the plate of FIG. 5A corresponding to an open state.

FIG. 5B shows an example of the plate 500 of FIG. 5A corresponding to an open state. In some implementations, relative rotation between the plate 500 and the body member 200 (FIGS. 2-4) can transition the plate from the closed state into the open state. The current orientation of the shaft 538 can correspond to the open state of an electronic device (e.g., the electronic device 100 as shown in FIGS. 1-2). For example, the shaft 538 has been rotated about the rotation axis 542 compared to its orientation in FIG. 5A.

The rotation of the shaft 538 can advance the bracket 518 along the shaft 538. For example, the groove(s) 540 can engage with a pin inside the cylinder 536. The advancement of the bracket 518 includes that the tongue 532 enters the recess 534. The bracket 518 rotates the arm 502 essentially counterclockwise about the pivot 510 by way of the engagement between the bracket 518 and the arm 502 at the pivot 514. For example, the arm 502 also rotates about the pivot 514. As part of the rotation of the arm 502 about the pivot 510, the portion 520 of the arm 502 translates the pin 506 in a direction generally away from the shaft 538. The direction of the translation can be essentially perpendicular to the rotation axis 542. The opening 504 can facilitate that the rotation of the arm 502 about the pivot 510 can translate the pin 506 in an essentially linear direction. For example, the arm 502 also rotates about the pivot 508. The pin 506 can be attached to the body member 104 (FIGS. 1-4). Accordingly, the above-described rotation of the shaft 538 can provide linear translation of the body member 104. When the electronic device is being brought toward the open state (e.g., as illustrated by the change in the plate 500 from FIG. 5A to FIG. 5B) the translation of the body member 104 is in a direction away from, in this example, the shaft 538, a hinge 544 and the body member 200 (FIGS. 2-4). For example, the slider 526 has a different position relative to the rest of the plate 500 in FIG. 5B compared to in FIG. 5A, which can correspond to the translation of the body member 104.

When the electronic device (e.g., the electronic device 100 (FIGS. 1-4) is being brought from the open state (e.g., as shown in FIGS. 3-4) toward the open state (e.g., as shown in FIGS. 1-2), the components can serve essentially corresponding roles. The body member 200 (FIGS. 2-4) can be rotated essentially clockwise about the hinge 208, relative to the body member 104 (FIGS. 1-4), in bringing the electronic device toward the closed state. For example, a clockwise rotation of the body member 200 can correspond to a clockwise rotation of the shaft 538 relative to the cylinder 536. The clockwise rotation of the shaft 538 can involve that the portion of the visible cylindrical surface of the shaft 538 that is closest to the observer in this illustration will travel along a direction opposite to that indicated by the arrow 546, for example toward the right in the present illustration. Moreover, the portion of the obscured cylindrical surface of the shaft 538 that is farthest from the observer in this illustration will travel along a direction opposite to that indicated by the arrow 548, for example toward the left in the present illustration.

The clockwise rotation of the shaft 538 can advance the bracket 518 along the shaft 538 in a direction opposite to that described above. For example, the groove(s) 540 can engage with a pin inside the cylinder 536. The advancement of the bracket 518 includes that the tongue 532 exits the recess 534. The bracket 518 rotates the arm 502 essentially clockwise about the pivot 510 by way of the engagement between the bracket 518 and the arm 502 at the pivot 514. For example, the arm 502 also rotates about the pivot 508. As part of the rotation of the arm 502 about the pivot 510, the portion 520 of the arm 502 translates the pin 506 in a direction generally toward the shaft 538. The direction of the translation can be essentially perpendicular to the rotation axis 542. The opening 504 can facilitate that the rotation of the arm 502 about the pivot 510 can translate the pin 506 in an essentially linear direction. The pin 506 can be attached to the body member 104 (FIGS. 1-4). Accordingly, the above-described clockwise rotation of the shaft 538 can provide linear translation of the body member 104. When the electronic device is being brought toward the closed state (e.g., as illustrated by the change in the plate 500 from FIG. 5B to FIG. 5A) the translation of the body member 104 is in a direction toward, in this example, the shaft 538, the hinge 544 and the body member 200 (FIGS. 2-4).

The hinge 544 can allow relative rotation between the plate 206 (FIGS. 2-4) or the plate 500 (FIGS. 5A-B) and the body member 200 (FIGS. 2-4). In some implementations, the hinge 544 can be a free-stop hinge, a torque hinge, a friction hinge, and/or a position-control hinge. For example, the hinge 544 can facilitate that the electronic device 100 (FIGS. 1-4) tends to remain in any arbitrary orientation (e.g., an open state, a closed state, or a state between the open and closed states). In some implementations, the hinge 208 (FIGS. 2-4) can be similar or identical to the hinge 544.

The above description exemplifies a mechanism 550 that here includes: the arm 502, the pins 506 and 512, the bracket 518 having the cylinder 536, and the pin 530. The plate 500 can include one or more instances of a mechanism such as the mechanism 550. In some implementations, the plate 500 can include a mechanism 552 having an arm, pins, bracket having a cylinder, and a pin corresponding to those of the mechanism 550. For example, the mechanism 552 can essentially be mirrored compared to the mechanism 550.

The above description exemplifies an electronic device (e.g., the electronic device in FIGS. 1-4) that includes: a processor (e.g., the processor 802 and/or 852 in FIG. 8); a memory (e.g., the memory 804 and/or 864 in FIG. 8); a first body member (e.g., the body member 104 in FIGS. 1-4); a second body member (e.g., the body member 200 in FIGS. 2-4); a flexible display (e.g., the flexible display 102 in FIGS. 1-4), wherein a first portion (e.g., the portion 108 in FIGS. 1-3) of the flexible display is mounted to the first body member, and wherein a second portion (e.g., the portion 202 in FIGS. 2-3) of the flexible display is mounted to the second body member; a shaft (e.g., the shaft 538 in FIGS. 5A-B) mounted to the second body member; and a first arm (e.g., the arm 502 in FIGS. 5A-B) having a first pivot (e.g., the pivot 510 in FIGS. 5A-B) with the plate and a second pivot (e.g., the pivot 508 in FIGS. 5A-B) with the first body member, the first arm engaged with the shaft so that relative rotation between the shaft and the plate rotates the first arm about the first and second pivots to alter a distance between the hinge and the first body member.

The above description exemplifies an electronic device (e.g., the electronic device in FIGS. 1-4) that includes: a processor (e.g., the processor 802 and/or 852 in FIG. 8); a memory (e.g., the memory 804 and/or 864 in FIG. 8); a first body member (e.g., the body member 104 in FIGS. 1-4); a second body member (e.g., the body member 200 in FIGS. 2-4); a flexible display (e.g., the flexible display 102 in FIGS. 1-4), wherein a first portion (e.g., the portion 108 in FIGS. 1-3) of the flexible display is mounted to the first body member, and wherein a second portion (e.g., the portion 202 in FIGS. 2-3) of the flexible display is mounted to the second body member; a shaft (e.g., the shaft 538 in FIGS. 5A-B) mounted to the second body member; a hinge (e.g., the hinge 208 in FIG. 2) coupled to the first and second body members; a first arm (e.g., the arm 502 in FIGS. 5A-B) having a first pivot (e.g., the pivot 508 in FIGS. 5A-B) with the first body member; and a threaded coupling (e.g., the cylinder 536 and groove 540 in FIGS. 5A-B) between the first arm and the shaft.

The above description exemplifies an electronic device (e.g., the electronic device in FIGS. 1-4) that includes: a processor (e.g., the processor 802 and/or 852 in FIG. 8); a memory (e.g., the memory 804 and/or 864 in FIG. 8); a first body member (e.g., the body member 104 in FIGS. 1-4); a second body member (e.g., the body member 200 in FIGS. 2-4); a flexible display (e.g., the flexible display 102 in FIGS. 1-4), wherein a first portion (e.g., the portion 108 in FIGS. 1-3) of the flexible display is mounted to the first body member, and wherein a second portion (e.g., the portion 202 in FIGS. 2-3) of the flexible display is mounted to the second body member; a plate (e.g., the plate 500 in FIGS. 5A-B) coupled to the second body member by a hinge (e.g., the hinge 208 in FIG. 2); an arm (e.g., the arm 502 in FIGS. 5A-B) having a first pivot (e.g., the pivot 508 in FIGS. 5A-B) with the first body member and a second pivot (e.g., the pivot 510 in FIGS. 5A-B) with the plate; and a threaded coupling (e.g., the cylinder 536 and groove 540 in FIGS. 5A-B) between the arm and the second body member.

The above description exemplifies an electronic device (e.g., the electronic device in FIGS. 1-4) that includes: a processor (e.g., the processor 802 and/or 852 in FIG. 8); a memory (e.g., the memory 804 and/or 864 in FIG. 8); a first body member (e.g., the body member 104 in FIGS. 1-4); a second body member (e.g., the body member 200 in FIGS. 2-4); a flexible display (e.g., the flexible display 102 in FIGS. 1-4), wherein a first portion (e.g., the portion 108 in FIGS. 1-3) of the flexible display is mounted to the first body member, and wherein a second portion (e.g., the portion 202 in FIGS. 2-3) of the flexible display is mounted to the second body member; a plate (e.g., the plate 500 in FIGS. 5A-B) coupled to the second body member by a hinge (e.g., the hinge 208 in FIG. 2) having a rotation axis (e.g., the rotation axis 542 in FIG. 5A), the plate slidingly coupled to the first body member; and an arm (e.g., the arm 502 in FIGS. 5A-B) pivotally coupled to the first body member, the arm engaging with the second body member to advance the first body member perpendicular to the rotation axis upon relative rotation between the first and second body members.

Figure 6:
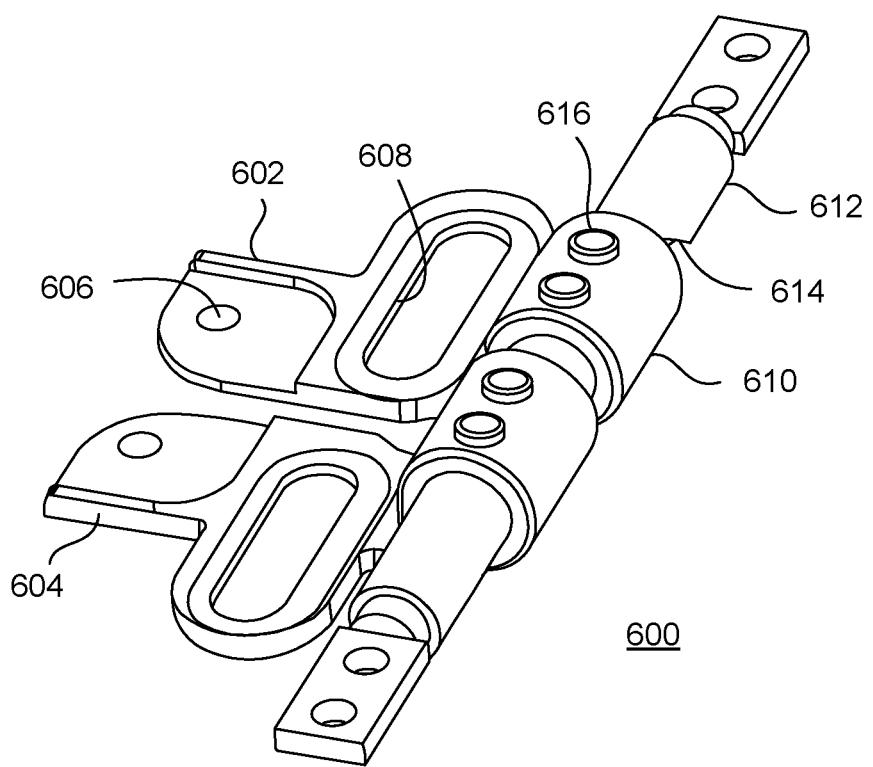
FIG. 6 shows an example of a shaft with brackets.

FIG. 6 shows an example of a shaft 600 with brackets 602 and 604. The shaft 600 and/or the brackets 602 and 604 can be used with one or more other examples described elsewhere herein. The bracket 602 has an opening 606. In some implementations, the opening 606 can facilitate engagement between the bracket 602 and an arm (e.g., the arm 502 in FIGS. 5A-B). For example, the opening 606 can correspond to the pin 516 in FIG. 5A. The bracket 604 can have an opening corresponding to the opening 606 which can perform a similar function. In some implementations, the positions of the opening 606 and the corresponding pin can be reversed. For example, the bracket 602 can be provided with a pin and the arm can have a corresponding opening.

The bracket 602 can have an opening 608. In some implementations, the opening 608 can facilitate linear translation of the bracket. For example, the opening 608 can engage with the pin 530 (FIG. 5A) which is coupled to the plate 500.

The bracket 602 can have a cylinder 610. In some implementations, the cylinder 610 can be configured to surround at least a portion of a shaft 612 for being translated along the shaft 612. At least one groove 614 (e.g., a spiral groove) on the shaft 612 can form a threaded engagement with a pin 616 inside the cylinder 610. In some implementations, the positions of the groove 614 and the pin 616 can be reversed. For example, the shaft 612 can be provided with a spiral thread and the inside of the cylinder 610 can have a corresponding structure engaging with the spiral thread. Rotation of the shaft 612 can facilitate linear translation of the bracket 602.

Figure 7A:
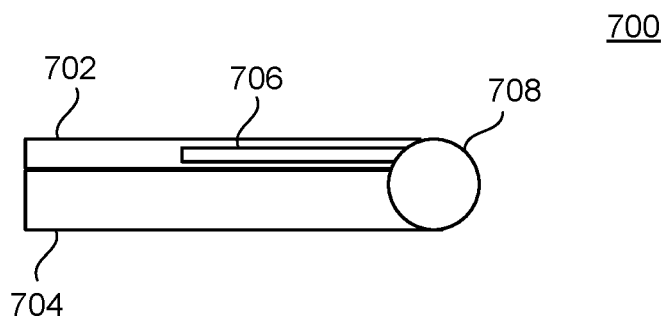
FIG. 7A schematically shows an example of an electronic device in a closed state.

The bracket 604 can have structures corresponding to those of the openings 606 and 608, cylinder 610 and/or pin 616. For example, rotation of the shaft 612 can facilitate linear translation of the bracket 604 in a direction opposite that of the translation of the bracket 602.

the first arm engages with the shaft using an engagement between a groove and a pin FIG. 7A schematically shows an example of an electronic device 700 in a closed state. The electronic device 700 can be used with one or more other examples described elsewhere herein. The electronic device 700 can be provided with a flexible display (e.g., the flexible display 102 of FIGS. 1-4) that is not shown for simplicity. In the closed state, a body member 702 is positioned adjacent (e.g., abutting) a body member 704. The body member 702 is configured for sliding engagement with a plate 706. The plate 706 is coupled to the body member 704 by a hinge 708.

Figure 7B:
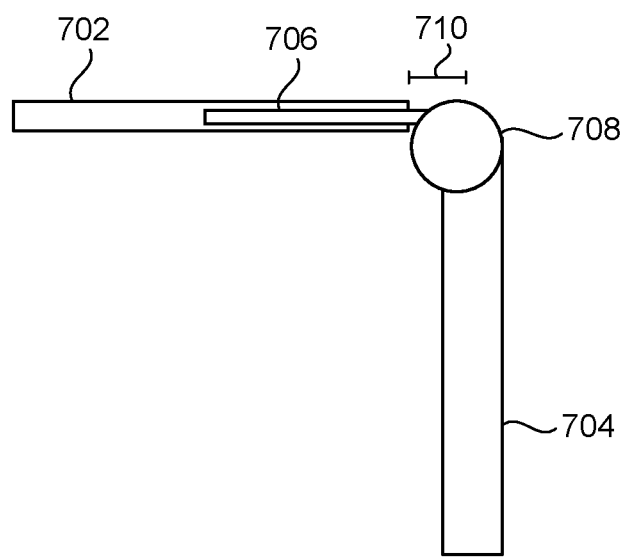
FIG. 7B schematically shows an example of the electronic device of FIG. 7A in a state between the closed state and an open state.

FIG. 7B schematically shows an example of the electronic device 700 of FIG. 7A in a state between the closed state and an open state. Here, relative rotation between the body member 704 and the plate 706 about the hinge 708 provides that the body members 702 and 704 are no longer adjacent/abutting each other. A mechanism (e.g., providing threaded engagement) has increased a distance 710 between an end of the body member 702 and a center of the hinge 708 compared to the distance in FIG. 7A.

Figure 7C:
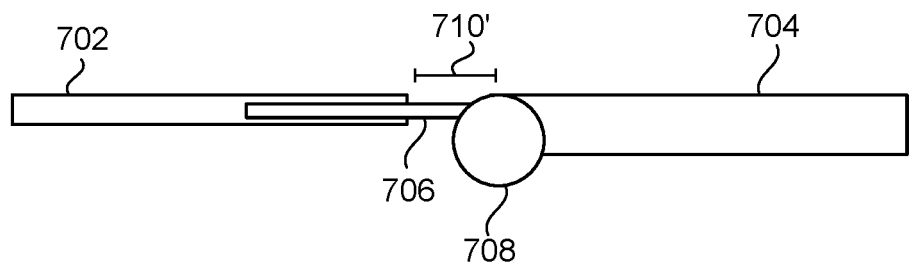
FIG. 7C schematically shows an example of the electronic device of FIG. 7A in the open state.

FIG. 7C schematically shows an example of the electronic device 700 of FIG. 7A in the open state. Here, further relative rotation between the body member 704 and the plate 706 about the hinge 708 provides that the body members 702 and 704 are forming essentially a common planar support surface (e.g., that can support a flexible display). A distance 710' between the end of the body member 702 and a center of the hinge 708 is increased compared to the distance 710 in FIG. 7B. The distances 710 and 710' can ensure that a flexible display is properly supported by the body members 702 and 704 in the open and closed states, and in states therebetween.

When the electronic device 700 is being brought from the open state (e.g., as shown in FIG. 7C) toward the open state (e.g., as shown in FIG. 7A), the components can serve essentially corresponding roles.

Figure 8:
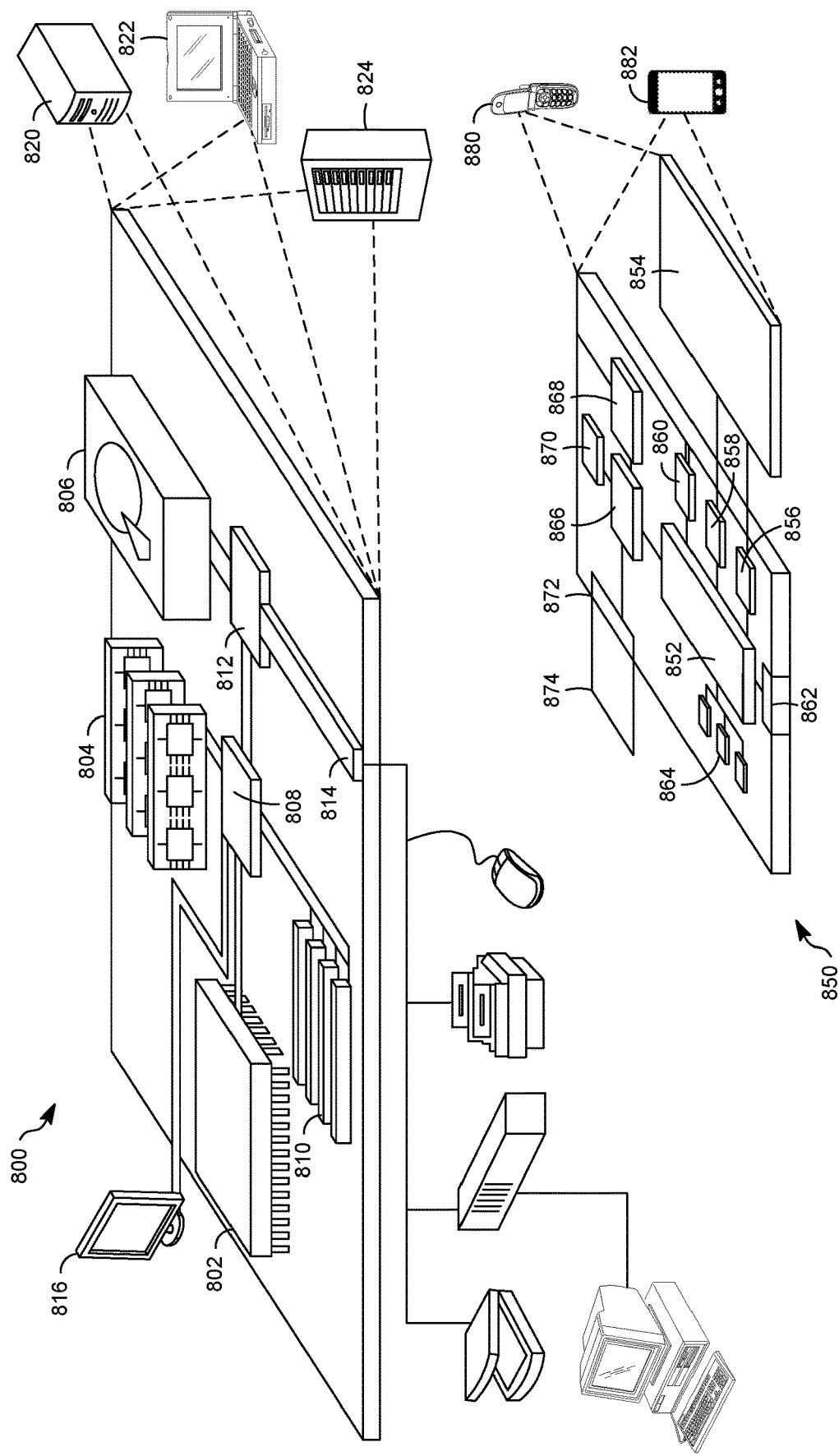
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electronic device comprising:
    a processor;
    a memory;
    a first body member;
    a second body member;
    a flexible display, wherein a first portion of the flexible display is mounted to the first body member, and wherein a second portion of the flexible display is mounted to the second body member;
    a shaft mounted to the second body member;
    a hinge coupled to the first and second body members;
    a first arm having a first pivot with the first body member; and
    a threaded coupling between the first arm and the shaft, wherein the threaded coupling comprises a spiral groove in the shaft, and a pin coupled to the first arm, the pin configured to travel in the spiral groove.

2. The electronic device of claim 1, wherein the first arm is engaged with the shaft using a bracket, the first arm having a second pivot with the bracket.

3. The electronic device of claim 2, wherein advancement of the bracket along the shaft rotates the first arm about the first and second pivots.

4. The electronic device of claim 2, wherein the bracket is a first bracket, the electronic device further comprising:
    a second arm pivotally coupled to the first body member; and
    a second bracket coupled to the second arm;
    wherein the first and second brackets are configured for travelling along the shaft in opposite directions from each other.

5. The electronic device of claim 1, further comprising a plate attached to the hinge and slidingly coupled to the first body member, the hinge coupled to the first body member by the plate, wherein the first arm has a second pivot with the plate.

6. The electronic device of claim 5, further comprising a second arm having a third pivot with the plate and a fourth pivot with the first body member, the second arm engaged with the shaft.

7. The electronic device of claim 5, wherein the first arm comprises a first portion and a second portion angled to each other, and wherein the first pivot is positioned at an end of the first portion of the first arm.

8. The electronic device of claim 7, wherein the second pivot is positioned at a junction between the first and second portions of the first arm.

9. The electronic device of claim 5, wherein the first arm is engaged with the shaft using a bracket, the first arm having a third pivot with the bracket, the electronic device further comprising a tongue on the bracket, and a recess in the plate, wherein movement of the bracket relative to the plate facilitates insertion of the tongue into the recess.

10. An electronic device comprising:
a processor;
a memory;
a first body member;
a second body member;
a flexible display, wherein a first portion of the flexible display is mounted to the first body member, and wherein a second portion of the flexible display is mounted to the second body member;
a plate coupled to the second body member by a hinge;
an arm having a first pivot with the first body member and a second pivot with the plate; and
a threaded coupling between the arm and the second body member, wherein the threaded coupling comprises a spiral groove coupled to one of the arm and the second body member, and a pin coupled to another of the arm and the second body member, the pin configured to travel in the spiral groove.

11. The electronic device of claim 10, wherein the threaded coupling comprises a shaft coupled to the second body member, and a bracket coupled to the arm.

12. The electronic device of claim 11, wherein the spiral groove is coupled to one of the bracket or the shaft, and wherein the pin is coupled to another of the bracket or the shaft.

13. The electronic device of claim 11, wherein the arm has a third pivot with the shaft, the first, second and third pivots having a common orientation.

14. The electronic device of claim 11, further comprising a tongue on the bracket, and a recess in the plate, wherein movement of the bracket relative to the plate facilitates insertion of the tongue into the recess.

15. The electronic device of claim 11, wherein the arm is a first arm and the bracket is a first bracket, the electronic device further comprising:
a second arm pivotally coupled to the first body member; and
a second bracket coupled to the second arm;
wherein the first and second brackets are configured for travelling along the shaft in opposite directions from each other.

16. An electronic device comprising:
a processor;
a memory;
a first body member;
a second body member;
a flexible display, wherein a first portion of the flexible display is mounted to the first body member, and wherein a second portion of the flexible display is mounted to the second body member;
a plate coupled to the second body member by a hinge having a rotation axis, the plate slidingly coupled to the first body member;
a first arm pivotally coupled to the first body member, the first arm having a first pivot with the first body member and a second pivot with the plate, the first arm engaging with the second body member to advance the first body member perpendicular to the rotation axis upon relative rotation between the first and second body members;
a shaft coupled to the second body member, wherein the first arm engages with the shaft via a third pivot;
a first bracket coupled to the first arm by the third pivot, wherein the first arm engages with the shaft through the first bracket;
a second arm pivotally coupled to the first body member; and
a second bracket coupled to the second arm;
wherein the first and second brackets are configured for travelling along the shaft in opposite directions from each other.

17. The electronic device of claim 16, wherein the first arm comprises a first portion and a second portion angled to each other, wherein the first pivot is positioned at an end of the first portion of the first arm, and wherein an end of the second portion of the first arm engages with the second body member.

18. The electronic device of claim 17, wherein the second pivot is positioned at a junction of the first and second portions of the first arm, the second pivot facilitating rotation of the first arm in a plane parallel to the plate between a first position corresponding to an open state of the electronic device, and a second position corresponding to a closed state of the electronic device.

19. The electronic device of claim 18, further comprising a recess in the plate configured to accommodate the first arm in the first and second positions.

20. The electronic device of claim 16, wherein the first bracket comprises a cylinder surrounding the shaft.

21. The electronic device of claim 20, further comprising a spiral groove on one of the cylinder or the shaft, and a pin on another of the cylinder or the shaft, the pin configured to travel in the spiral groove.

22. The electronic device of claim 16, wherein the first, second and third pivots have a common orientation.

23. The electronic device of claim 16, further comprising a tongue on the first bracket, and a recess in the plate, wherein movement of the first bracket relative to the plate facilitates insertion of the tongue into the recess.

* * * * *